(12) United States Patent
Taskov et al.

(10) Patent No.: US 11,756,254 B2
(45) Date of Patent: Sep. 12, 2023

(54) LIGHT IMPORTANCE CACHING USING SPATIAL HASHING IN REAL-TIME RAY TRACING APPLICATIONS

(71) Applicant: Nvidia Corporation, Santa Clara, CA (US)

(72) Inventors: Blagovest Borislavov Taskov, Saratoga, CA (US); Apollo Ellis, University Place, WA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/115,010

(22) Filed: Dec. 8, 2020

(65) Prior Publication Data
US 2022/0180591 A1 Jun. 9, 2022

(51) Int. Cl.
*G06T 15/06* (2011.01)
*G06T 1/60* (2006.01)
*G06T 15/50* (2011.01)

(52) U.S. Cl.
CPC .............. *G06T 15/06* (2013.01); *G06T 1/60* (2013.01); *G06T 15/506* (2013.01)

(58) Field of Classification Search
CPC ........ G06T 15/06; G06T 15/50; G06T 15/506
See application file for complete search history.

(56) References Cited

U.S. PATENT DOCUMENTS

| 4,866,637 A | * | 9/1989 | Gonzalez-Lopez .......................... G06T 15/506 345/426 |
| 2016/0071308 A1 | * | 3/2016 | Nichols .................... G06T 15/50 345/426 |
| 2016/0260247 A1 | * | 9/2016 | Fursund ................ G06T 15/506 |
| 2017/0278309 A1 | * | 9/2017 | Hurter ..................... G06T 15/20 |
| 2019/0378323 A1 | | 12/2019 | Bakalash |
| 2020/0302675 A1 | | 9/2020 | Story |
| 2021/0166464 A1 | * | 6/2021 | Moloney ................ G06T 15/005 |

OTHER PUBLICATIONS

Liu, Xiao-Dan, and Chang-Wen Zheng. "Adaptive importance photon shooting technique." Computers & graphics 38 (2014): 158-166. (Year: 2014).*

(Continued)

*Primary Examiner* — Ryan McCulley
(74) *Attorney, Agent, or Firm* — Hogan Lovells US LLP

(57) ABSTRACT

Light contribution information can be determined and cached for use in rendering image frames for a scene. In at least one embodiment, a spatial hash data structure can be used to split the scene into regions, such as octahedral voxels. Using cast light rays, an average light contribution can be computed for each individual voxel. Those light values can then be used to build a cumulative distribution function for each voxel that can be used to select which lights to sample for a given frame during rendering. The sampling for a region or voxel can be based at least in part upon the number of contributing lights for that region, as well as the relative contributions of those lights. Such an approach can be very bandwidth and cache efficient, while providing high image quality.

20 Claims, 11 Drawing Sheets

(56) References Cited

OTHER PUBLICATIONS

Vévoda, Petr, Ivo Kondapaneni, and Jaroslav Křivánek. "Bayesian online regression for adaptive direct illumination sampling." ACM Transactions on Graphics (TOG) 37.4 (2018): 1-12. (Year: 2018).*
Alexander Keller, Ken Dahm, Nikolaus Binder: "Path Space Filtering", Monte Carlo and Quasi-Monte Carlo Methods, Springer Proceedings in Mathematics & Statistics, 2016, pp. 423-436, Springer International Publishing Switzerland.
Extended European Search Report issued in EP Application No. 21212205.5, dated Jun. 13, 2022.

* cited by examiner

LIGHT IMPORTANCE CACHING USING SPATIAL HASHING IN REAL-TIME RAY TRACING APPLICATIONS

BACKGROUND

As the quality of display devices—along with user expectations—continues to increase, there is a need to continually increase the quality of content to be displayed. This can include tasks such as realistically lighting objects of a scene to be rendered. In complex scenes with many light sources, including reflective or refractive surfaces, there may be insufficient resource capacity to accurately represent all lighting in a scene, particularly for applications where a high frame rate is required.

BRIEF DESCRIPTION OF THE DRAWINGS

Various embodiments in accordance with the present disclosure will be described with reference to the drawings, in which.

DETAILED DESCRIPTION

Approaches in accordance with various embodiments can overcome various deficiencies in existing approaches to image generation. In particular, various embodiments can provide for the determination and caching of importance information for one or more light sources in a scene. The importance information can be determined for individual regions of a scene, as may relate to individual voxels, and can include directionality data. This importance information can be used to determine an amount of sampling to be performed for these different regions, based at least in part upon factors such as a number of important lights and a determined importance of those lights. Relative to sampling all of a large number of light sources, or approximating a sampling of all such light sources, such an approach can be significantly more bandwidth and cache efficient, while providing high image quality.

In various real time and offline rendering systems, a sequence of images or video frames can be generated using a virtual camera view of a three-dimensional scene. This scene can include static or dynamic objects of various types, as well as one or more light sources for illuminating these objects. The objects can include any type of foreground or background objects that can be represented visually in an image or other digital view. The light sources can also be any appropriate source of light or illumination that may impact of one or more of these scene objects, where that light can be of different color or intensity. At least some of these scene objects may also be reflective or refractive, such that they may impact illumination from one or more of these light sources, or may function as a separate light source in some situations.

Figure 1A:
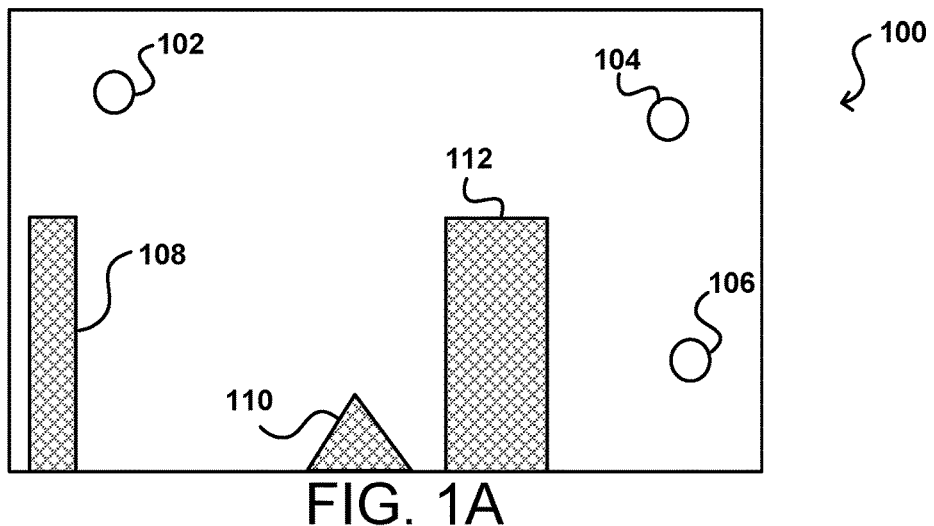
FIGS. 1A, 1B, and 1C illustrate raytracing for objects in a scene, according to at least one embodiment.

FIG. 1A illustrates an example view 100 that could be generated for such a scene in accordance with various embodiments. In this example, the view 100 is that of a virtual camera with respect to a virtual three-dimensional (3D) environment, resulting in a two-dimensional (2D) representation of that environment from a determined point of view. In this particular view, or image frame, there are three objects 108, 110, 112 referred to herein as scene objects. These scene objects can include any objects capable of being represented in a scene, as may include background or foreground objects, player avatars in games, dynamic or static objects, and so on. These objects may have different lighting characteristics, as may include at least a portion of an object being opaque, transparent, reflective, transmissive, or refractive, among other such options. An object may also have different surface properties or textures that may impact its lighting characteristics. There are also three light sources 102, 104, 106 in this scene. These light sources may be any objects or elements that are capable of producing some type of illumination, as may include light sources such as the sun, a lamp, a neon sign, and the like. In order to render this view of the scene in a realistic way, the light from the various light sources 102, 104, 106 should illuminate the scene objects 108, 110, 112 similar to how those scene objects would be illuminated in a real world setting. This can include not only direct illumination, but also aspects such as reflections and creation of shadows.

One approach to determining such illumination involves ray tracing. Ray tracing refers to a rendering technique that utilizes an algorithm to trace the path of light from a light source, and then simulate the way that the light interacts with scene objects that the ray "hits," or intersects, in a computer-generated environment. Ray tracing can provide realistic shadows and reflections, as well as accurate translucence and scattering. Ray tracing also has an advantage in that it can execute on a graphics processing unit (GPU), such as in a GeForce RTX graphics card produced by NVIDIA Corporation, to perform lighting determinations in sufficient time to allow accurate rendering to be performed in real time for high frame rate applications.

Figure 1B:
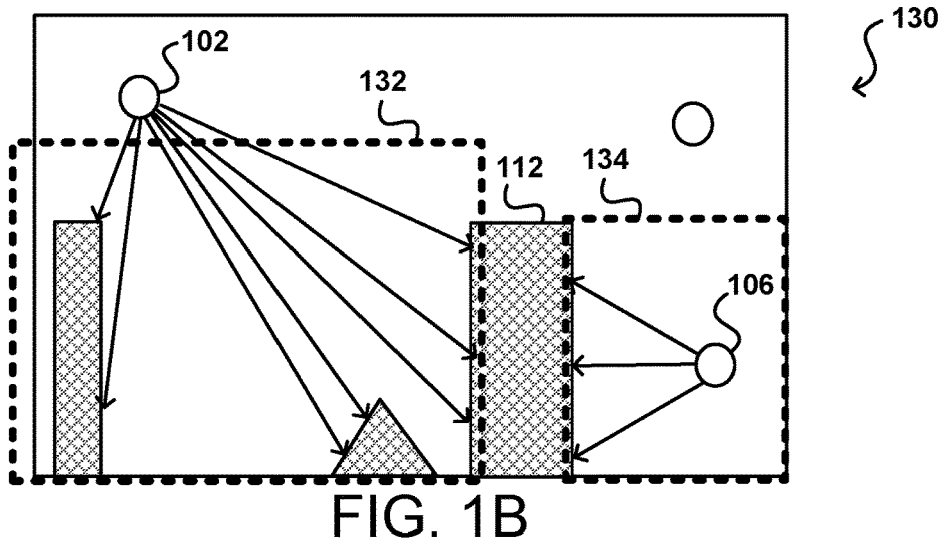

A view 130 of this scene illustrated in FIG. 1B shows example rays from two of the light sources 102, 106. While there could be at least one ray cast for each potential pixel location in a scene from each potential light source, such an approach can be very resource-intensive. Accordingly, a ray tracing approach will often select or "sample" some of these rays for each frame to determine updated lighting information that can be approximated based on those samples and, in at least some cases, prior lighting information from a prior frame. FIG. 1B illustrates an example selection of rays from light sources 102 and 106. As illustrated, rays from each of these light sources hit point along different objects, or portions of those objects, based at least in part upon the relative positioning of those light sources and objects in a scene.

Approaches in accordance with various embodiments can take advantage of this information to allow for more optimal sampling of light rays for a frame or scene. For example, rays from light source 102 hit all three objects in this scene, but do not hit the right side of scene object 112. Further, scene object 112 obstructs light rays from light source 102 from hitting much of the frame to the right of scene object 112. Rays from light source 102 predominantly hit the top and right of scene object 108 (reference carried over between figures for convenience), potentially all of scene object 110, and the top and left of scene object 112. A region 132 of the scene can then be determined in which light source 102 is of relatively high importance (greater contribution), as that region includes surfaces of objects that may be hit by rays from light source 102. Similarly, rays from light source 106 hit the right side of scene object 112, but scene object 112 obstructs those rays from hitting scene objects 108 and 110. Accordingly, a region 134 of the scene can be defined in which light source 106 is of relative importance. As can be seen, light source 102 may contribute less to the lighting in region 134 as rays from that light source are mostly obstructed from objects in region 134. Similarly, light source 106 may contribute less to region 132 as rays from that light source are also mostly obstructed from objects in region 132. Approaches in accordance with various embodiments can utilize such importance information when determining which rays to sample for a frame, or portions of a frame, as it can be more valuable to sample only rays for light sources that provide a more significant contribution to a given portion or region.

In at least one embodiment, rays may be sampled for a region only for those light sources determined to be of at least some importance. This may include up to a maximum number of important light sources in some embodiments. In other embodiments, even light sources of little to no determined contribution for a region may have one or more rays sampled per frame to account for changes in the scene. For example, movement of an object may allow rays to pass to that region, or may reflect rays into that region, etc. Further, contribution determinations may be determined using sampling, and thus may not analyze each potential ray, such that the contribution calculation may be determined using incomplete data and a light source may in fact have some undiscovered importance to a region. Such an approach allows for such lighting impact to be determined, without dedicating significant resources to light sources that are of generally low importance to a region or portion of a scene.

Figure 1C:
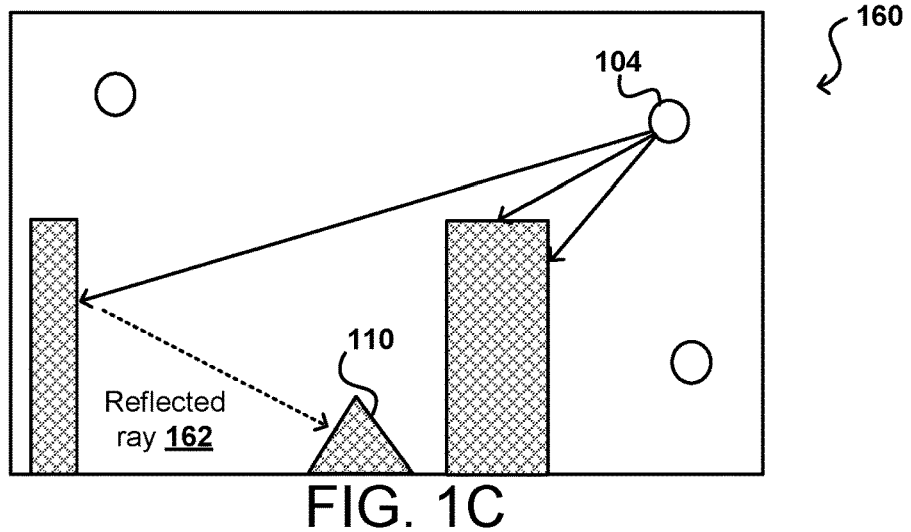

An example view 160 illustrated in FIG. 1C illustrates sample rays cast from light source 104. In this example, rays from light source 104 directly hit portions of scene objects 108 and 112. As illustrated, a ray 162 reflected from scene object 108 hits scene object 110 as well. In such a situation, the light source 104 may contribute to each region of this scene, and as such may have rays sampled for all regions. In at least some embodiments, the contribution determined for different regions may vary, however, such that the amount or frequency of sampling for rays of light source 104 may vary by region.

Figure 2:
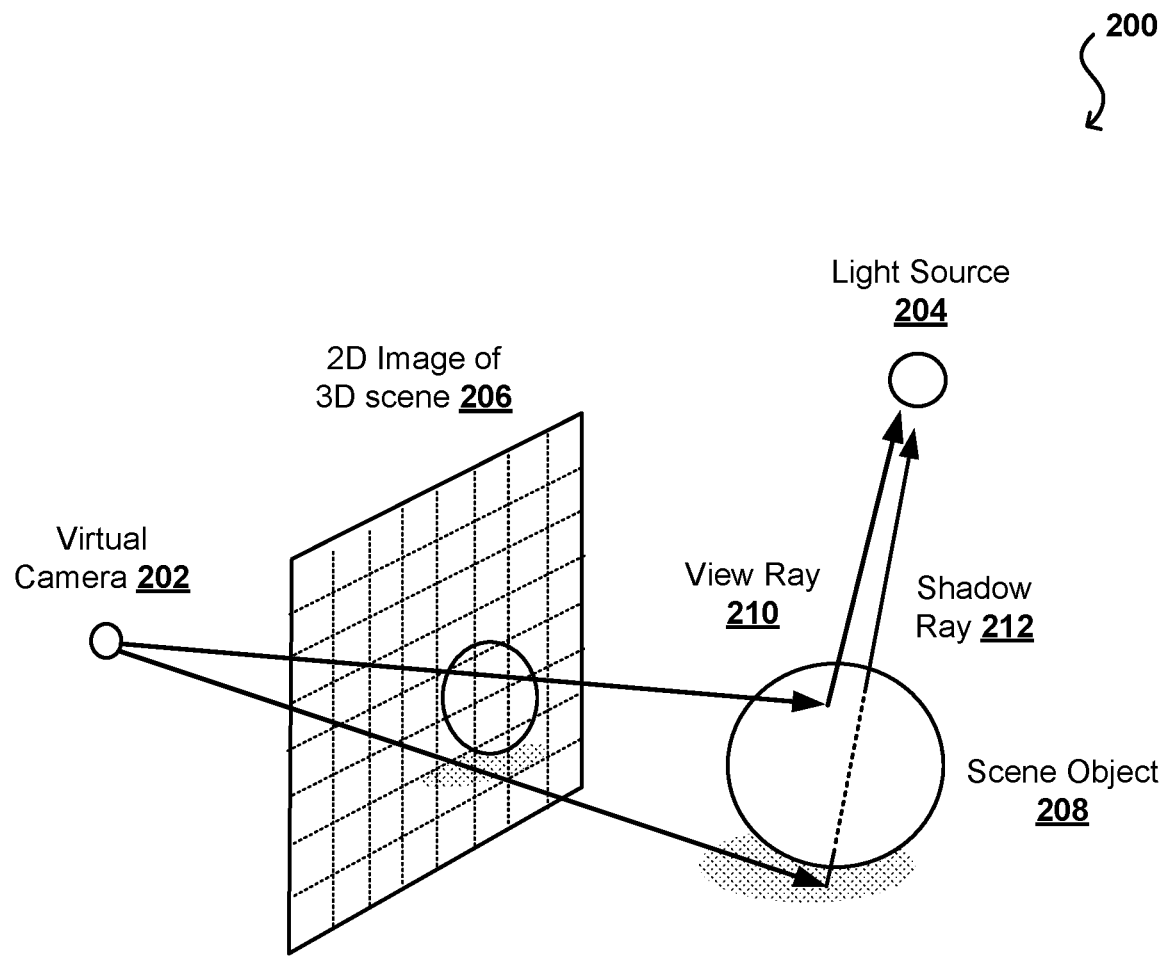
FIG. 2 illustrates ray tracing for both view and shadow rays, according to at least one embodiment.

In at least one embodiment, there can also be different types of rays sampled for a given scene. As illustrated in the view 200 of FIG. 2, there is a single light source 204 and a single scene object 208 in this scene. A two-dimensional image 206 of this three-dimensional scene is rendered from the point of view of a virtual camera 202, which in at least some embodiments can be moved or reoriented about the scene for different frames. The image will correspond to a plane that intersects that virtual camera view at a determined location. In order to render the image 206, a renderer must determine which portion(s) of this scene object 208 are visible from that camera view in order to determine the content to be represented in the image. Further, the renderer must determine the illumination for each such portion in order to realistically render the object relative to the light source. As illustrated, this can include determining at least two types of rays. A first type of ray, referred to herein as a view ray, corresponds to a point or region on scene object 208 that is visible in the virtual view, and is illuminated (directly or indirectly) by light source 204. A second type of ray, referred to herein as a shadow ray, corresponds to a point or region in the scene, such as on the ground or floor in an example environment, upon which an object such as scene object 208 would cast a shadow based, at least in part, upon light cast from light source 204. In this case, a shadow ray 212 from light source 204 to scene object 208 would be obstructed by object 208 and would thus not hit this shadow region. That ray can be extended, however, to determine that a shadow can be cast at that location by scene object 208 with respect to light source 204. Thus, light rays can be determined not only for direct lighting, but for shadows, reflections, refractions, diffusions, and other such lighting aspects. These different types of rays can be sampled with similar or different sampling rates or frequencies, and in some embodiments can be sampled based at least in part upon their relative importance to a scene or region.

Figure 3A:
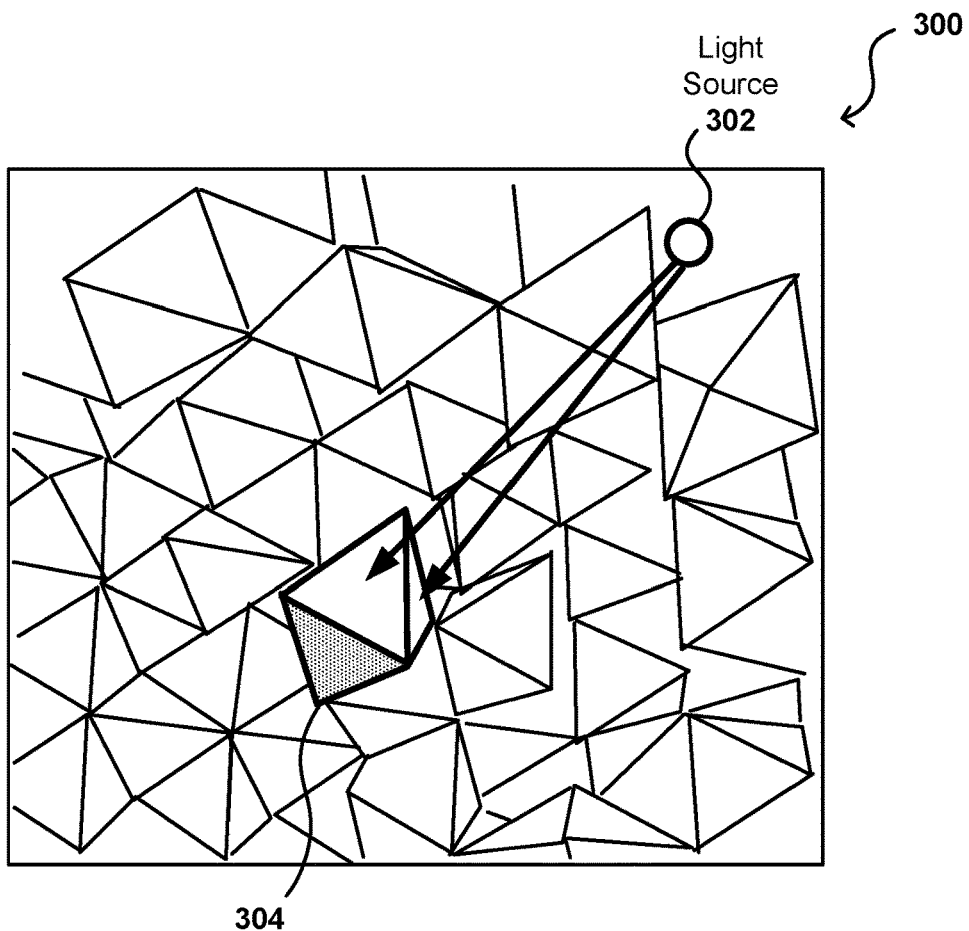
FIGS. 3A and 3B illustrate ray tracing with octahedral voxels, according to at least one embodiment.

A virtual three-dimensional environment can be made up of a plurality of individual voxels in a 3D grid. In various rendering systems, each voxel would comprise a virtual cube, triangle, octahedral, or other such shape or geometric object associated with a certain portion of a scene. In ray tracing, rays can be shot for individual voxels to determine any objects (e.g., triangle meshes or higher order primitives) that are hit by that ray, and that intersection information can be stored for use in rendering. In various instances, however, it may be desirable to capture directionality data for a voxel as well. For example, there may be material properties of a voxel such that one light source might be important (contribute more) from a first direction, but a different light source may be important from a second direction. In such instance, it may be desirable to utilize voxels that can capture at least some of this dimensionality. In at least one embodiment, octahedral voxels can be used for objects of a scene, as illustrated in view 300 of FIG. 3A. Other geometries can be used as well, such as tetrahedral voxels in at least some embodiments. As illustrated in FIG. 3A, rays from a light source 302 may hit at least two different faces of an octahedral voxel 304 that are visible in a virtual camera view. Also as illustrated, there is at least one face of that voxel 304 for which that light source 302 does not hit the voxel 304. Such directionality information can help to better determine an importance of that light source 302 with respect to that voxel. An octahedral geometry can be selected in at least some embodiments because it provides a simple and efficient way to determine contributions from various light sources at different locations, or directions, in a scene.

Figure 3B:
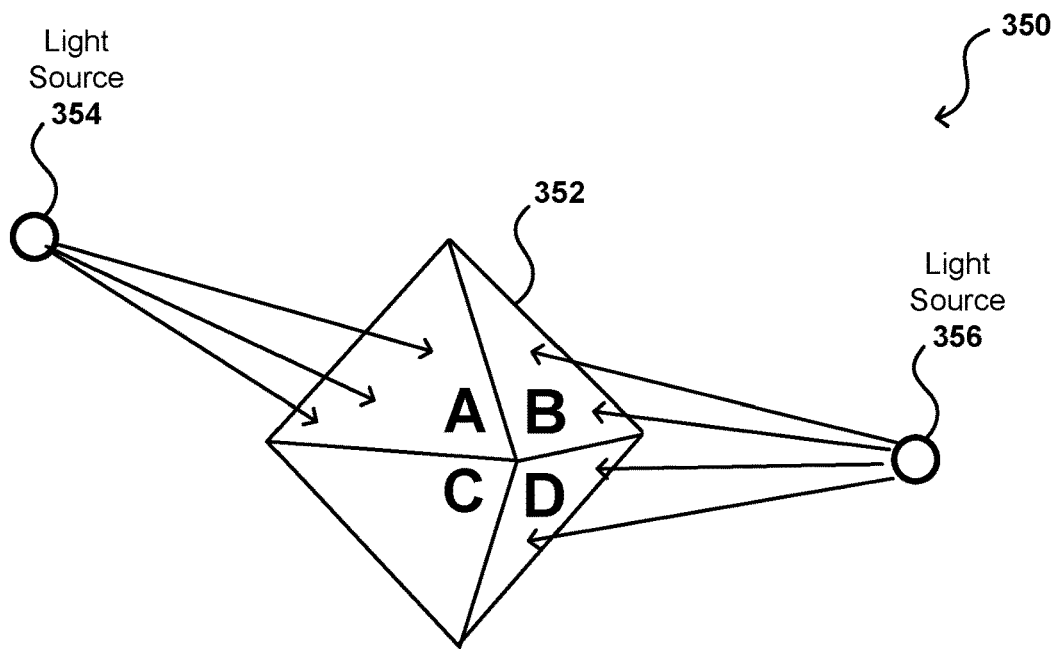

The example view 350 of FIG. 3B illustrates an octahedral voxel 352 with four sides or faces (A, B, C, D) visible in a virtual camera view. This might be a voxel representative of a portion of a thin wall or object, for example, with a first light source 354 on one side and a second light source 356 on the other side. As illustrated, the first light source 354 is important for two of the faces (A, C), while the second light source 356 is important for the other two faces (B, D). In such an instance, importance information can be determined based at least in part upon directionality, where the light sources may each be determined to be important, but only for a respective range of directions, or number of faces. In at least one embodiment, a rendering interface may provide a user with an option to turn on, or off, the octahedral voxel representation of the 3D environment.

Each of these voxels can correspond to a respective spatial hash. There may be different rays that hit different portions of this same spatial hash. Using an octahedral voxel to represent this hash provides a relatively simple way to determine and store directional light information for a same spatial hash. Such an approach enables both shadow and view (or proximity) rays to be traced or projected to these voxels from different light sources and directions, and store this information for rendering. This information can also help to determine the relative importance and/or contribution of each light source for a given voxel, set of voxels, or region of a scene or image. It should be noted, however, that having the spatial hash (map) with an octahedral allows association of a position and direction in a scene to a location in memory, where light contribution information can be stored. As mentioned, however, it may be too inefficient or resource intensive in many situations to sample all possible rays for a scene, particularly for non-point light sources, such that ray sampling can be utilized. Instead of just selecting rays at random, or by using pseudo-random sampling, other sampling methods or algorithms can be utilized, such as quasi-Monte Carlo-based methods. Such methods can provide for the generation of low discrepancy sequences that can be transformed into light paths. Such an approach can utilized deterministic, low-discrepancy sequences to generate path segments. In order to generate light path segments, components of the vector of a low discrepancy sequence can be partitioned into at least two sets, which can then be used to trace the $i^{th}$ camera and light path segment.

A path segment in accordance with at least one embodiment can be determined by first selecting an origin, such as a light source, then selecting a direction to trace a ray. At a first point of intersection with a scene surface, another decision can be made with respect to on path termination, as well as a direction of scattering to trace a next ray, if appropriate. This process can be repeated as necessary. An example approach to determining a light path utilizes a shadow ray, and determining whether the end points of individual path segments of the shadow ray are visible. While shadow rays are sufficient for mostly diffuse surfaces, shadow rays may not be efficient for light paths that include specular-diffuse-specular segments, such as light reflected by a mirror onto a diffuse surface and reflected back by the mirror. To address such inefficiencies, photon trajectories can be connected to camera path segments by proximity, also referred to as photon mapping, which can help to efficiently capture contributions of shadow rays. Using such an approach to path space filtering, segments of various light paths can be generated by following light rays (or photon trajectories) from a selected light source and tracing paths from the virtual camera. End points of these path segments are then connected if they are mutually visible, for a shadow ray, or sufficiently close (e.g., in sufficient proximity). Path space filtering can be utilized along with these connection techniques in at least one embodiment. The contribution $c_i$ to the vertex $x_i$ of a light path can be replaced by a smoothed contribution $\bar{c}_i$ resulting from averaging contributions $c_{s_i+j}$ to vertices inside a determined region. This averaged contribution $\bar{c}_i$ then can be multiplied by a throughput n of the path segment towards the camera and accumulated on the image plane P.

To ensure consistency, the size of the region should vanish with an increasing number of samples ii. In at least one embodiment, this can include reducing a radius r of a spherical region. Photon mapping can then be used to connect end points of path segments that are less than a specified radius apart. Decreasing a radius r (n) with an increasing number n of sampled light paths provides some level of consistency, as in the limit it in fact becomes equivalent to shadow ray connections. Similar to stochastic progressive photon mapping, consecutive batches of light transport paths can be processed. Depending on the low discrepancy sequence used, some block sizes may be preferable over others.

Such an approach is beneficial at least in the fact that progressive path space filtering is a fast and consistent variance reduction technique that is complementary to shadow rays and progressive photon mapping, enabling a sparse set of samples to provide sufficient information for high quality image generation. While various multiple vertices of a light path may be selected using various approaches, one choice is the first vertex along the path from the camera whose optical properties are considered sufficiently diffuse. One low discrepancy sequence can be transformed to sample path space in contiguous batches of light transport paths, where for each path one selected tuple is stored for path space filtering. As the memory consumption is proportional to the batch size, and given the size of the tuples and the maximum size of a memory block, can be relatively straightforward to determine the maximum natural number.

In at least one embodiment, this light data can be temporarily stored or cached for use in generating images of a scene. In at least one embodiment, samples of radiance can be cached and interpolated to increase the efficiency of light transport simulation implemented in a rendering engine. Other than radiance interpolation, path space filtering efficiently can filter across discontinuities such as detailed geometry. Such filtering can also overcome excessive trajectory splitting to reduce noise in the cached samples, which enables efficient path tracing. In addition, a presence of consistency-related artifacts in a frame can be reduced through this computation without separate computation. The averaging process may be iterated within a batch of light transport paths, yielding a further dramatic speed up at the potential cost of some blurred illumination detail.

Although such an approach can be consistent even without weighting, for larger radii the resulting images may appear overly blurred as contributions become included in the average that could not have been gathered in $x_i$. In order to reduce this transient artifact of light leaking and to benefit from larger radii to include more contributions in the average, the weights can be determined so as to value how likely the contribution $c_{s_i+j}$ could have been created in vertex $x_i$ by trajectory splitting. Blurring approaches can be utilized that perform blurring across geometry or across textures. When blurring across geometry, the similarity of the surface normal and other surface normals can be determined by their scalar product. When blurring across textures, the images may be optimal if the optical surface properties were evaluated by vertex for contributions included in the average. For surfaces other than diffuse surfaces, such as glossy surfaces, these properties may depend at least in part upon the direction of observation, which can then be stored with the vertex. Some of this additional memory can be saved when directions are implicitly known to be similar, as for example for query locations xi as directly viewed from the camera. For blurred shadows, given a point light source, its visibility as seen from different vertices may be either identical or different. In order to avoid sharp shadow boundaries to be blurred, contributions may be only included upon identical visibility. For ambient occlusion and illumination by an environment map, blur can be reduced by comparing the lengths of each one ray shot into the hemisphere at these vertices by thresholding their difference.

Such a path space filtering approach can be implemented on top of any sampling-based rendering algorithm, and can be implemented with little additional overhead. A progressive algorithm can efficiently reduce variance, and can guaranteed to converge without persistent artifacts due to consistency. Such a space filtering, or spatial hashing, approach can be used to split the screen into voxels, such as the octahedral voxels described with respect to FIGS. 3A and 3B. Such an approach is suitable for applications such as real-time ray tracing, and in at least some embodiments can be performed solely in one or more GPUs, all while solving various deficiencies with prior art approaches. Such an approach can also be advantageous at least in part because it does not require additional functionality for sampling or tracing than is already present in various ray tracers. The processes can instead gather statistics about rays projected for a scene to determine an importance of each light source for a particular part of a scene, to determine how much sampling to perform on that part of the scene based upon factors such as visibility and material properties of the scene. Such an approach can result in the need for far fewer samples than was necessary in prior approaches, such as ReSTIR, particularly for world space sampling rather than screen space sampling. The need for many additional samples in prior approaches often results in approximations being performed instead, which can reduce image quality for these prior approaches. Approaches in accordance with various embodiments can instead determine and cache information about which light sources are determined to be important for various regions of a scene, and can generate actual samples on those lights based at least in part upon their relative importance. In at least some embodiments, at least two steps can be used to determine these samples, including determining the importance of the light sources, then using an analytical solution to select or "pick" samples from those light sources for a scene. In at least some embodiments, this can be performed using multiple importance sampling (MIS).

As mentioned, however, determining which light source is important in a scene can be difficult for complex or dynamic scenes. For example, there might be only a few rays from a light source that impact a surface due to occlusions or positioning, or due to movement in a scene. Sampling only a subset of possible rays for a scene may result in the rays from a light source to an object not being sampled for a number of frames, which may improperly cause that light source to have a lower importance calculated for that object or region than should be determined. In some embodiments, a sampling pattern utilized between two regions of a scene may be vastly different, such that when tracing rays there may be grid-like artifacts on borders of various voxels. In order to address at least this type of artifact, boundaries between voxels can be blurred by jittering locations from which data is sampled. Such jittering or offset-based sampling can effectively turn these voxel-like artifacts into noise, which can help to improve overall image quality. In such an approach, the probability distribution function (PDF) for light selection can remain consistent from frame to frame, resulting in a gradual change in noise patterns as light sources move in the scene. In at least one embodiment, a normal direction can be jittered as well for similar reasons.

As mentioned, importance values in at least some embodiments can be determined at the voxel level. These voxels may not be regularly sized, as octahedral voxels of a scene may instead be arranged into voxels of potentially varying sizes, such as voxels that increase in size with distance from a virtual camera for a scene. In various embodiments, the light information for all rays that have already been cast in a scene can be collected for each voxel, with an average light contribution being computed at each voxel. In at least one embodiment this contribution data can correspond to radiance data, or an amount of directional power from each light source hitting that voxel. In at least one embodiment, light sources such as sphere light sources may be treated as a single light source, at least for importance determinations, independent of a number of triangles or other geometric components that compose that light source, although other light source abstractions can be used as well within the scope of various embodiments. In at least some embodiments, any object that is emitting light in a scene can be treated as a light source.

These average values can then be used to generate a cumulative distribution function (CDF) for light selection or picking. A discretized CDF can be generated for every frame, or for every n frames, where n can be selected to a value such as 2, 4, 8, or 10 based upon factors such as performance and resource availability. Such an approach can help to amortize the cost of building the CDF. The CDF can be built using the average contribution for each light source at each voxel to determine relative importance of these light sources for these voxels for each frame, or n frames. The CDF for a real-valued random variable X can be given by:

$$F_X(x)=P(X \leq x)$$

where the right side of this equation represents the probability that the random variable X has a value less than, or equal to, x. Operations used to build these functions, such as to determine a prefix sum and a reduction sum, can be performed serially or in parallel in different embodiments, as these can involve high performance computing primitives that can be executed in parallel on various GPUs. Various other performance enhancements can be utilized as well, such as to build these CDFs over voxels in parallel over the voxels and lights, or to build CDFs for groups of voxels instead of individual voxels.

In various embodiments, data for a CDF can take the form of an array of floating point numbers between 0 and 1, where every next consecutive number is bigger than, or equal to, the previous number. A binary search can then be performed using this array. Each time a light source is to be sampled, the process can access the CDF for this voxel and perform a binary search using, for example, a random number. The index in this array that corresponds to that binary search can then be utilized. The importance information can also be used to guide adaptive sampling. For example, a greater amount or portion of sampling or shadow ray casting can be dedicated to regions with multiple important lights, in order to more accurately capture important light information without spending excess effort in regions where there may only be one or two important light sources and it is not as important to cast a large number of shadow rays or capture as many samples. Such an approach thus enables shoot fewer shadow rays in regions where there may only be one or two important lights, while a greater number of shadow rays can be applied to regions of the scene where there appear to be a greater number of important lights. In a potential performance enhancement, the CDF can be compressed into unorm. Instead of working in floating points, which are 32 bits, a lower precision can be used that will not bias the result. Instead of storing a CDF value that is a floating point, that value can be stored as an 8-bit value, which can save on bandwidth and cache storage.

In some embodiments, identifying a smaller number of more important lights can allow for use of additional solutions or approaches that might otherwise be impractical for usage. For example, a linearly transformed cosines (LTC)-based approach can be utilized for smaller numbers of light sources. Further, knowing which are the most important lights for a region, as well as the number of important lights, can be useful for guided adaptive sampling such that the shadow ray budget is not utilized uniformly across an image to be rendered, but portions of the budget are focused more heavily where the effort is more important. In at least one embodiment, a PDF can be utilized to evaluate variance, such as to perform light culling. Light culling can effectively cull, or remove from consideration, lights that are not important for a region and retain lights that are important, or are "hero" lights, for that region. An evaluation such as an LTC evaluation that may be relatively expensive, can then be performed only for the important lights. The numbers in the CDF, which may include statistics and standard deviation information in at least one embodiment, can then be used to determine when more shadow rays are needed due to the higher variance.

In at least one embodiment, an attempt can be made to ensure that PDFs that received a value of zero, indicating that a light source is not important for a region or voxel, has the chance to obtain a non-zero value if that light source may in fact have some importance for that region or voxel. As mentioned, the sampling approach may miss rays that only pass from a light to an object through small openings or as a result of movement in a scene. It can be desirable to provide a way to capture this importance that may not have been captured over a period of random sampling. In at least one embodiment, this can be performed by shooting a number of rays to random lights in a scene, regardless of their importance or that are deemed to have relatively low importance, for each frame or subset of frames. This can provide an opportunity for those light sources to have rays sampled that might hit an object or region, to enable the respective PDF to have a non-zero value as a result of a detected hit. In some embodiments, this may include shooting a small number of shadow rays for each voxel, for every frame or every n frames, to a number of randomly (and uniformly) picked light sources. Thus, a small budget of shadow rays can be used to attempt to discover light interactions that were previously missed through the sampling approach. Another approach would be avoid allowing a PDF to have a value of 0, such that there is always allowance for some contribution of a light source. In at least one embodiment, this can involve setting a minimum allowable PDF value to be assigned to a light source.

The PDF is determined based at least in part upon the number of lights in the scene. For a continuous function, the probability density function (PDF) is the probability that the variate has value x. For a discrete distribution, the PDF can be given by:

$$f(x)=P[X=x]$$

In at least one embodiment, the PDF can correspond to one over the number of lights in a scene, multiplied by one over the number of shadow rays that are shot from that spatial hash, or voxel. In at least one embodiment, there can be a refresh of at least a subset of light values for every frame. The new information obtained for a frame can be used to update the data structure which stores the average radiance. At the end of calculations for a frame, a new CDF can be built will have a new probability for a given light source. In at least one embodiment, the number of entries can be fixed, and a replacement policy used to minimize the amount of memory needed for these operations. Such an approach may store information only for a maximum number of most important lights. In other approaches, light information may only be stored for lights with importance values that meet or exceed a minimum importance threshold.

As mentioned, jitter-based blending can be used when sampling voxels in at least one embodiment. Other blending approaches can be used as well, as may relate to PDF animation. This may involve, for example, a linear interpolation animation between PDFs. When a new PDF is obtained at the end of a frame, there is an old PDF from the frame before, and it can be desirable to animate that transition. PDF can be animated for such purpose. Other approaches can move away from an average-based approach to instead utilize a maximum-based approach. As mentioned, there may be lights that only hit voxels occasionally or for a small percentage of rays, such that their impact can be minimized through an average-based approach. If those rays have a high radiance value, however, it may be desirable to retain that information. A maximum-based approach can retain information for the maximum contribution returned for a light for any voxel, with a corresponding blending approach between a high PDF and a low PDF so that the radiance of the high PDF can be retained, without overly sampling that light due to its relatively low overall importance.

In some embodiments, partial CDFs may be generated and stored for usage. A partial CDF may only build a given CDF over a fixed number, selection, or subset of lights in a scene. In one example, a random variable can be sampled and compared against a threshold b. If the value of this random sample is greater than b then a light can be selected from, for example, a fixed size list. This selection can be performed using the partial CDF with probability given by:

$$Probability=(1-b)*PartialPDFValue+b*(1/n)$$

where n is the total light count and PartialPDFValue is constructed from the partial CDF with a subtraction. If the random sample is lower than b, a light may be selected uniformly from all lights with probability given by b*(1/n). To update the structure, the maximum contribution from a light can be accumulated over all uniformly selected lights for a frame, with a light being selected in the fixed size structure to replace with the maximum contributor. The replacement can be implemented in at least one embodiment by choosing a random slot to replace, or by another method such as picking the lowest PDF and rolling a die to determine whether to replace it.

Figure 4:
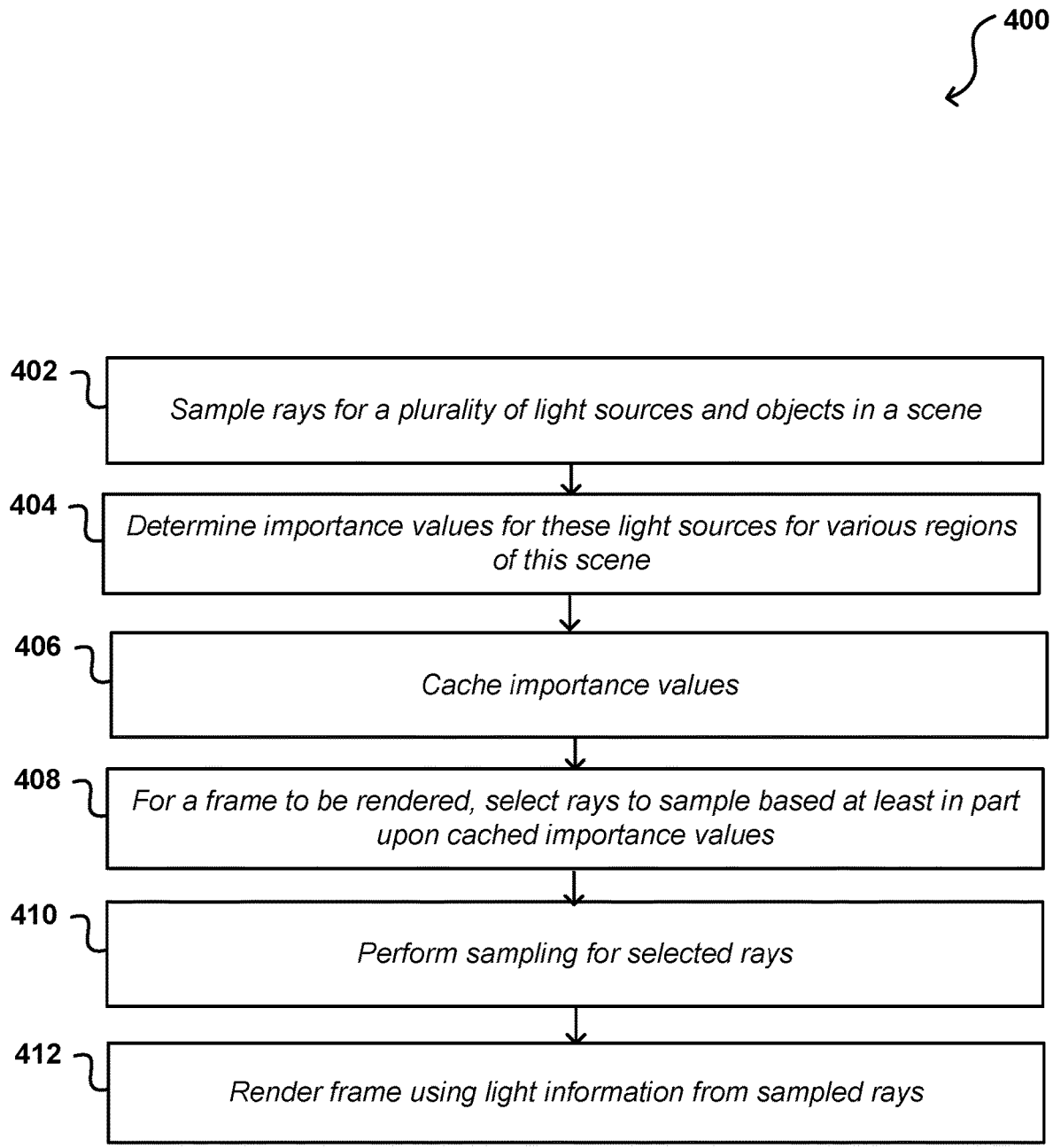
FIG. 4 illustrates an example process for rendering a frame for a scene, according to at least one embodiment.

FIG. 4 illustrates an example process 400 for rendering a frame or image for a scene that can be performed in accordance with various embodiments. It should be understood that for this and other processes presented herein there can be additional, fewer, or alternative steps performed in similar or alternative order, or at least partially in parallel, within scope of various embodiments unless otherwise specifically stated. In this example, a number of rays are sampled 402 for a plurality of light sources and objects in a scene. Data from this sampling can be used to determined 404 importance values for these light sources for various regions of this scene. Various approaches can be used to divide a scene into regions, as may include dividing the region into a plurality of octahedral voxels of varying size. These importance values can be cached 406, such as in a GPU memory. In at least one embodiment, a probability value for picking each light source can be stored into the cache, where that probability value can be calculated using the importance values. For a frame to be rendered, as may be part of a sequence of frames, a number of rays can be selected 408 to be sampled (out of all possible rays that could be cast to all possible light sources) based at least in part upon these cached importance values. For a given region, or voxel, the number of rays to be sampled can be based at least in part upon a number of important light sources, as well as a relative importance of those light sources. Once selected, sampling can be performed 410 for those selected rays. This information can be used to update cached data for this scene. The light information obtained from these sampled rays can also be used to render 412 this frame, such as to realistically illuminate objects in this scene based on factors such as the placement, shape, and radiance of these light sources relative to objects in this scene. Other types of regions can be selected as well, as may relate to uniformly or differently sized tiles.

Figure 5:
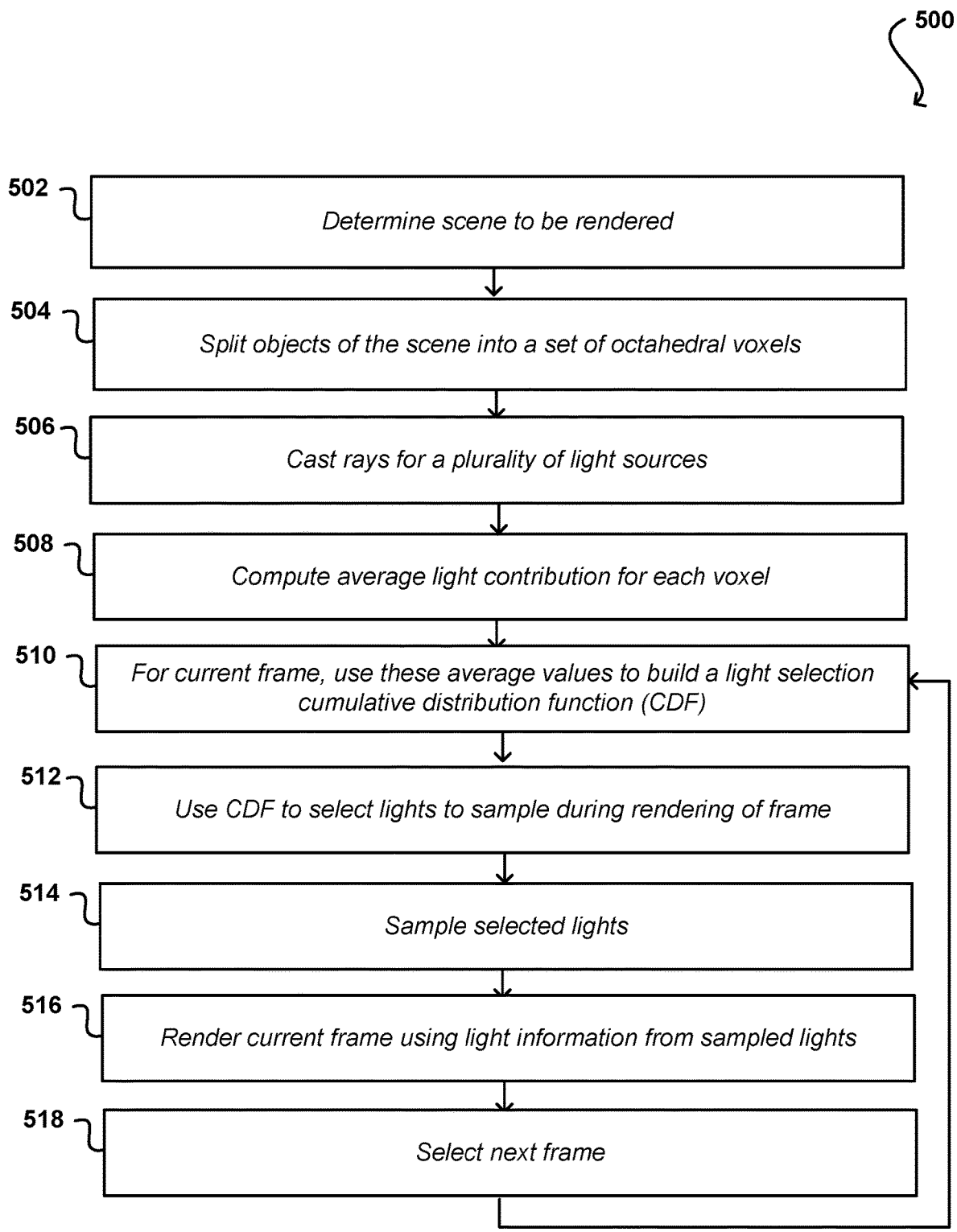
FIG. 5 illustrates a process for performing ray tracing during rendering, according to at least one embodiment.

FIG. 5 illustrates another example process 500 for rendering a frame that can be performed in accordance with at least one embodiment. This example process can represent one or more implementation choices for a more general process, such as the process 400 illustrated in FIG. 4. In this example, a scene to be rendered is determined 502. This can include, for example, determining a virtual three-dimensional environment, as well as objects and light sources placed within, or proximate, that environment. In this example, objects of this scene (including both foreground and background objects) may optionally be split 504 into a set of octahedral voxels, while other types of regions can be used as well within the scope of various embodiments. In some embodiments, spatial hashing allows for a determination of voxel identifier, or location in memory, for a location, as well as direction if available during rendering. Rays (e.g., shadow rays) can be cast for a plurality of light sources in this environment. An average light contribution from these rays can be computed 508 for each voxel. This can include directionality consideration in at least some embodiments. For a current frame in a sequence to be rendered for this scene, these average values can be used 510 to build a cumulative distribution function (CDF) for light selection. This CDF can then be used 512 to select lights to sample during rendering of the current frame. These selected lights can then be sampled 514, and the current frame rendered 516 using the light information from these sampled lights, as well as cached light information from previous frames or samplings in at least one embodiment. Unless there are no more frames to be rendered for this sequence, the next frame can be selected 518 and the process can continue with another sampling with an updated CDF.

Figure 6:
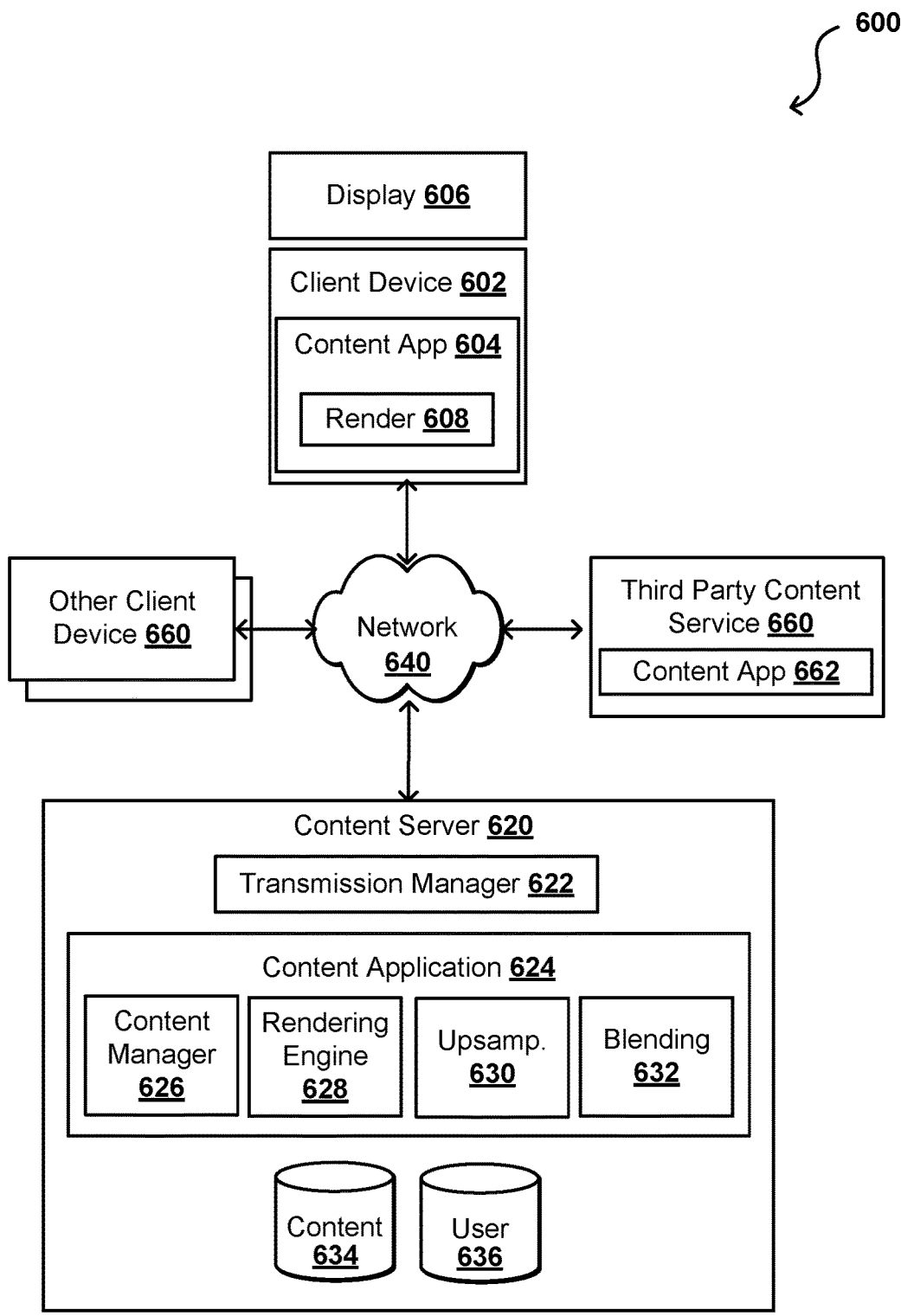
FIG. 6 illustrates an example image generation system including light importance caching, according to at least one embodiment.

In at least one embodiment, aspects of rendering and presentation of frames of content can be performed in various locations, such as on a client device, by a third party provider, or in the cloud, among other such options. FIG. 6 illustrates example components 600 that can be used to generate, provide, and present such content in accordance with various embodiments. In at least one embodiment, a client device 602 can generate content for a session, such as a gaming session or video viewing session, using components of a content application 604 on client device 602 and data stored locally on that client device. In at least one embodiment, a content application 624 (e.g., a gaming or streaming media application) executing on content server 620 may initiate a session associated with at least client device 602, as may utilize a session manager and user data stored in a user database 634, and can cause content 632 to be determined by a content manager 626 and rendered using a rendering engine 628, if needed for this type of content or platform, and transmitted to client device 602 using an appropriate transmission manager 622 to send by download, streaming, or another such transmission channel. In at least one embodiment, client device 602 receiving this content can provide this content to a corresponding content application 604, which may also or alternatively include a rendering engine 608 for rendering at least some of this content for presentation via client device 602, such as video content through a display 606 and audio, such as sounds and music, through at least one audio playback device, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or content database 634, to client device 602. In at least one embodiment, at least a portion of this content can be obtained or streamed from another source, such as a third party content service 650 that may also include a content application 652 for generating or providing content. In at least one embodiment, portions of this functionality can be performed using multiple computing devices, or multiple processors within one or more computing devices, such as may include a combination of CPUs and GPUs.

In at least one embodiment, content application 624 includes a content manager 626 that can determine or analyze content before this content is transmitted to client device 602. In at least one embodiment, content manager 626 can also include, or work with, other components that are able to generate, modify, or enhance content to be provided. In at least one embodiment, this can include a rendering engine 628 for rendering content, such as aliased content at a first resolution. In at least one embodiment, an upsampling or scaling component 630 can generate at least one additional version of this image at a different resolution, higher or lower, and can perform at least some processing such as anti-aliasing. In at least one embodiment, a blending component 632, as may include at least one neural network, can perform blending for one or more of those images with respect to one or more prior images, as discussed herein. In at least one embodiment, content manager 626 can then select an image or video frame of an appropriate resolution to send to client device 602. In at least one embodiment, a content application 604 on client device 602 may also include components such as a rendering engine 608, such that any or all of this functionality can additionally, or alternatively, be performed on client device 602. In at least one embodiment, a content application 652 on a third party content service system 650 can also include such functionality. In at least one embodiment, locations where at least some of this functionality is performed may be configurable, or may depend upon factors such as a type of client device 602 or availability of a network connection with appropriate bandwidth, among other such factors. In at least one embodiment, an upsampling module 630 or blending module 632 may include one or more neural networks for performing or assisting in this functionality, where those neural networks (or at least network parameters for those networks) can be provided by content server 620 or third party system 650. In at least one embodiment, a system for content generation can include any appropriate combination of hardware and software in one or more locations. In at least one embodiment, generated image or video content of one or more resolutions can also be provided, or made available, to other client devices 660, such as for download or streaming from a media source storing a copy of that image or video content. In at least one embodiment, this may include transmitting images of game content for a multiplayer game, where different client devices may display that content at different resolutions, including one or more super-resolutions.

Data Center

Figure 7:
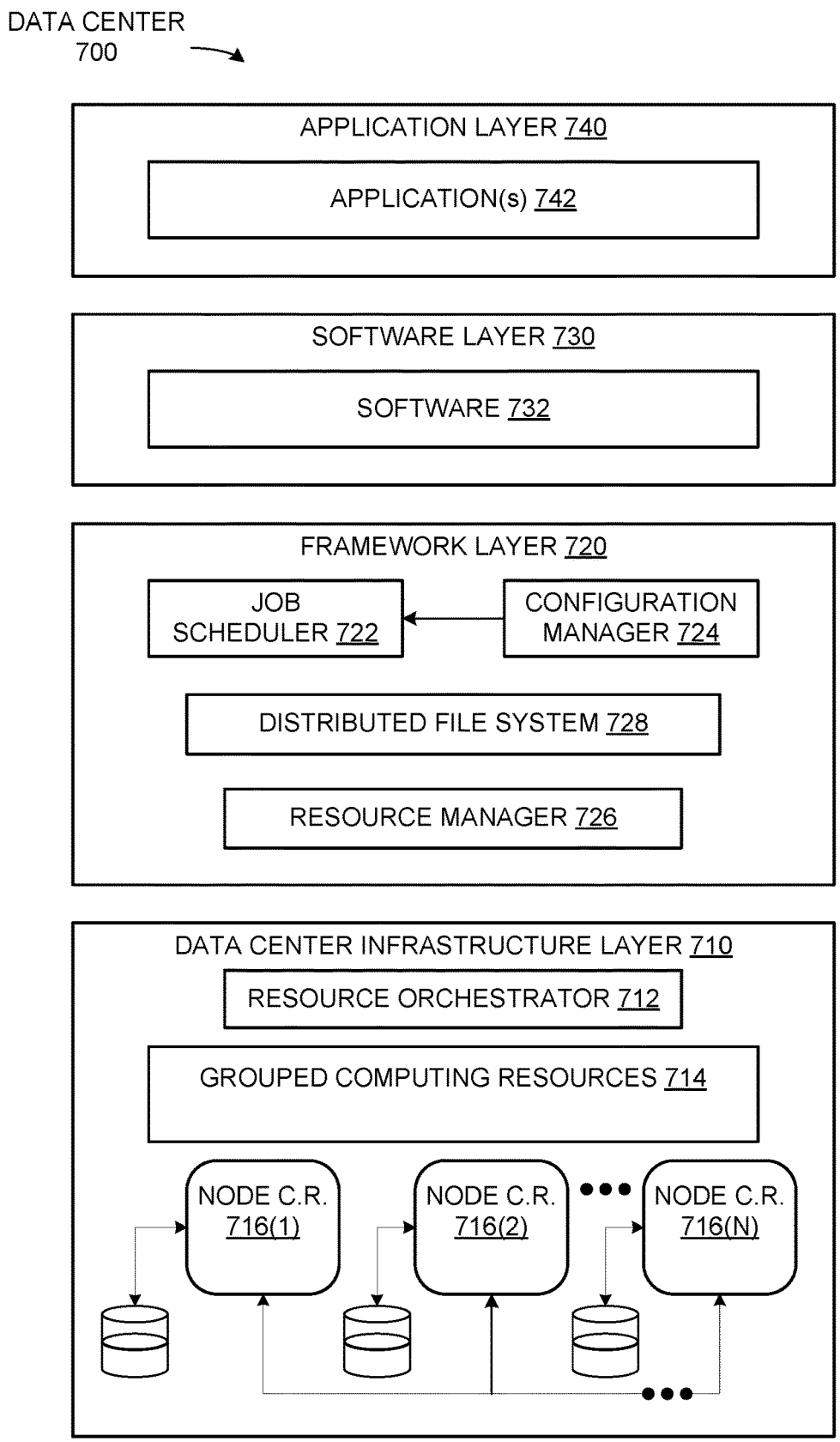
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to improve image quality during image generation by caching light importance information and using that information to determine ray sampling for an image or video frame.

Computer Systems

Figure 8:
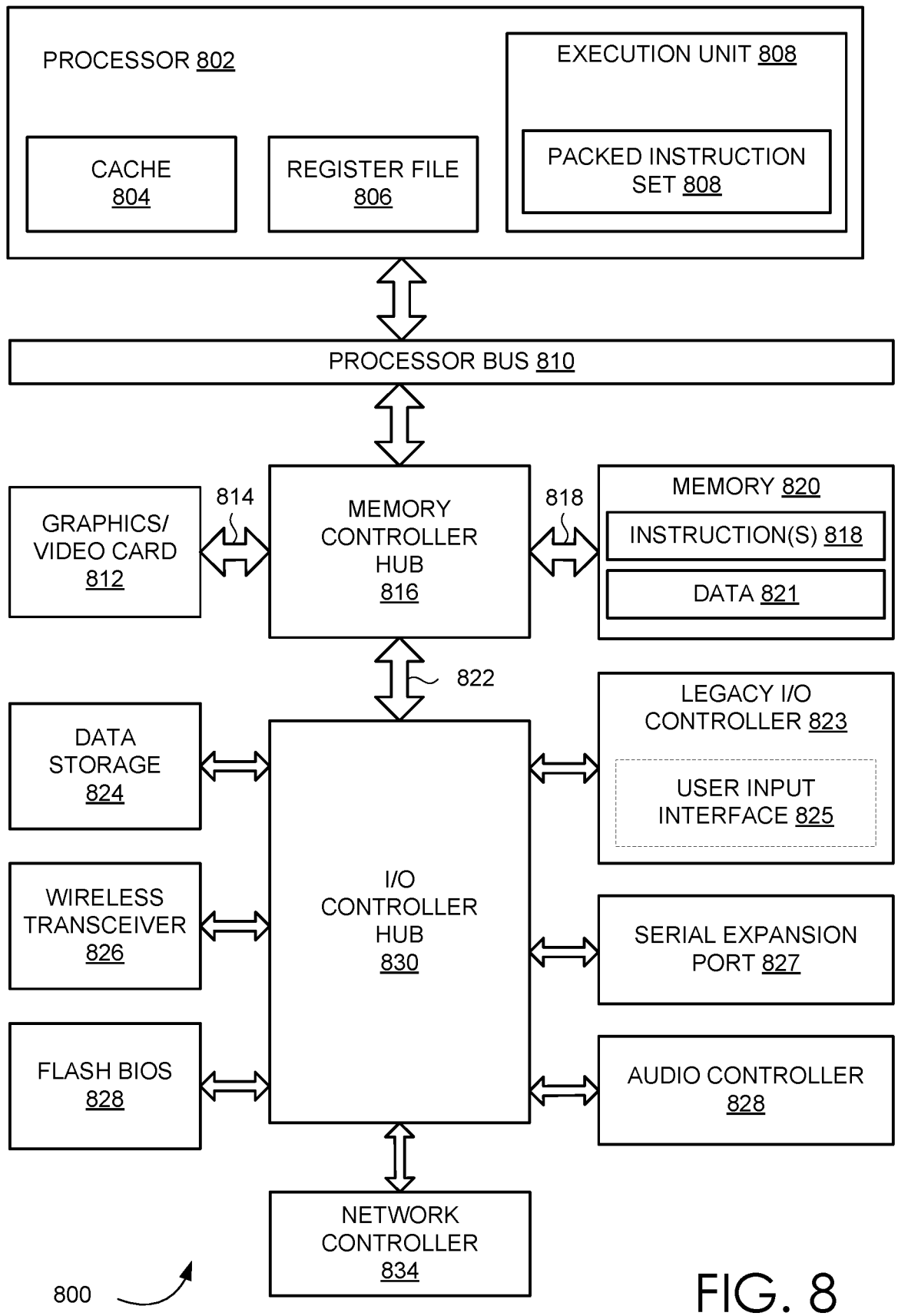
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used to improve image quality during image generation by caching light importance information and using that information to determine ray sampling for an image or video frame.

Figure 9:
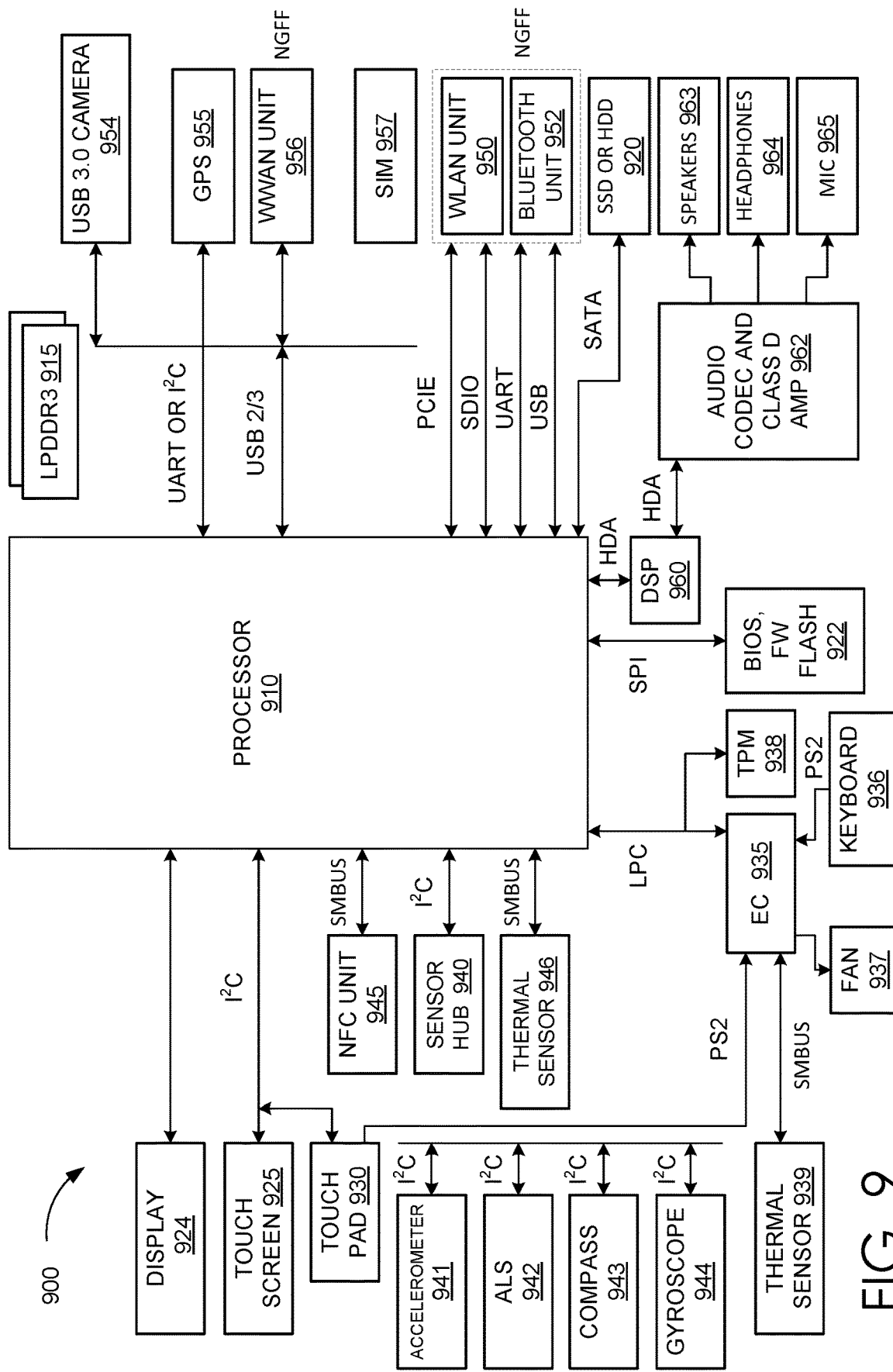
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to improve image quality during image generation by caching light importance information and using that information to determine ray sampling for an image or video frame.

Figure 10:
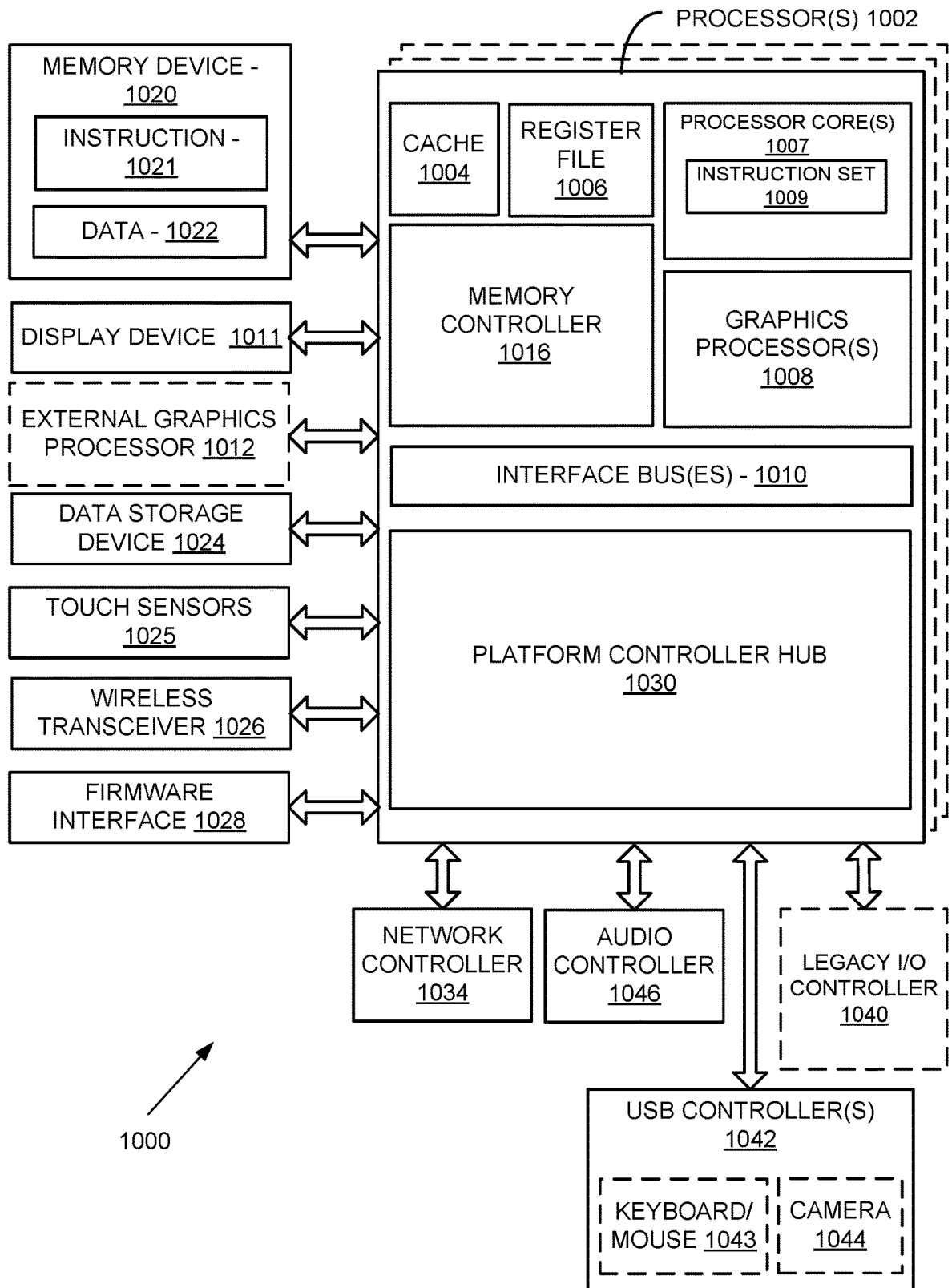
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to improve image quality during image generation by caching light importance information and using that information to determine ray sampling for an image or video frame.

Figure 11:
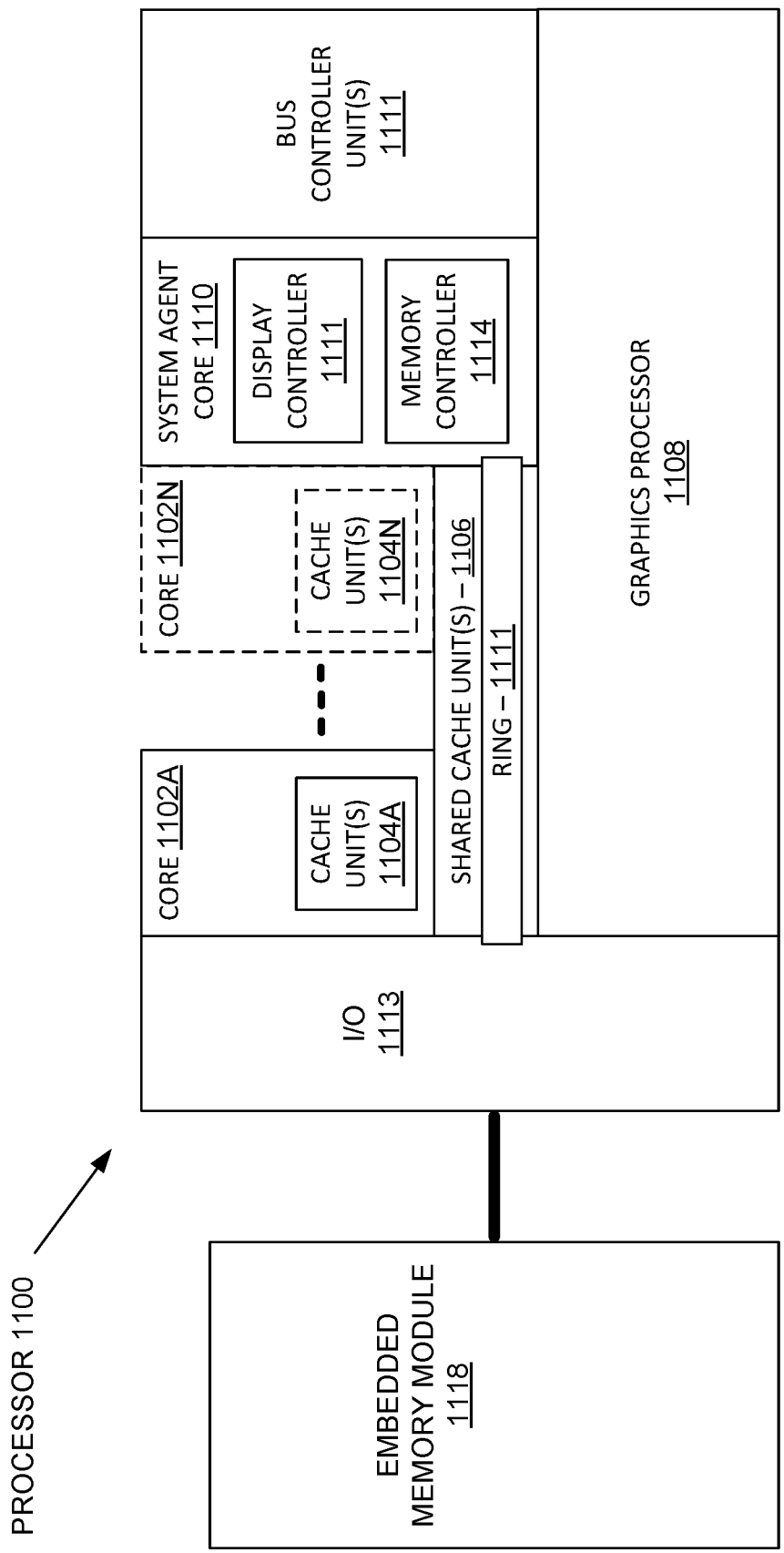
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to improve image quality during image generation by caching light importance information and using that information to determine ray sampling for an image or video frame.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   determining light information for a first set of rays cast for two or more light sources in a virtual environment, the light information including average light contribution from the first set of rays determined based at least on a directional magnitude of the two or more light sources;
   determining, based at least in part on the light information, values for the two or more light sources with respect to a plurality of spatial regions of the virtual environment, wherein a spatial hashing algorithm segments the virtual environment into the plurality spatial regions corresponding to a plurality of non-cubic voxels;

selecting, based at least in part upon the values, a second set of rays to sample for the two or more light sources with respect to the plurality of spatial regions, the second set of rays including a greater number of samples for the light sources with higher values;

sampling the second set of rays to obtain updated illumination information for the plurality of spatial regions; and rendering an image for the virtual environment using the updated illumination information.

2. The computer-implemented method of claim 1, further comprising:

using the spatial hashing algorithm to determine the plurality of spatial regions of the virtual environment, wherein the spatial regions also provide directional information.

3. The computer-implemented method of claim 2, wherein the plurality of non-cubic voxels is a plurality of octahedral voxels, the plurality of octahedral voxels being of one or more sizes.

4. The computer-implemented method of claim 3, further comprising:

determining the values for a selected light source based at least in part upon directionality information for the selected light source with respect to respective octahedral voxels.

5. The computer-implemented method of claim 1, further comprising:

using the values to build cumulative distribution functions (CDFs) for the plurality of spatial regions; and caching selection probability data determined according to the CDFs for the plurality of spatial regions, the selection probability data to be used to select the second set of rays.

6. The computer-implemented method of claim 5, further comprising:

updating the CDFs for the plurality of spatial regions for at least a subset of images of an image sequence for the virtual environment.

7. The computer-implemented method of claim 1, further comprising:

selecting up to a maximum number of light sources with highest values from which to sample the second set of rays.

8. The computer-implemented method of claim 1, further comprising:

determining the values for the two or more light sources with respect to the plurality of spatial regions based at least in part upon average light contributions for individual light sources with respect to individual spatial regions.

9. The computer-implemented method of claim 1, further comprising:

causing two or more light sources with determined values below a threshold to be considered for sampling for one or more subsequent images to be rendered.

10. A system, comprising:

a processor; and memory including instructions that, when executed by the processor, cause the system to:

determine light information for a first set of rays cast for two or more light sources in a virtual environment, the light information including average light contribution from the first set of rays determined based at least on a directional magnitude of the two or more light sources;

determine, based at least in part on the light information, values for the two or more light sources with respect to a plurality of spatial regions of the virtual environment, wherein a spatial hashing algorithm segments the virtual environment into the plurality spatial regions corresponding to a plurality of non-cubic voxels;

select, based at least in part upon the values, a second set of rays to sample for the two or more light sources with respect to the plurality of spatial regions, the second set of rays including a greater number of samples for light sources with higher values;

sample the second set of rays to obtain updated illumination information for the plurality of spatial regions; and render an image for the virtual environment using the updated illumination information.

11. The system of claim 10, wherein the instructions when executed further cause the system to:

use the spatial hashing algorithm to determine the plurality of spatial regions of the virtual environment.

12. The system of claim 11, wherein the plurality of non-cubic voxels is a plurality of octahedral voxels, the plurality of octahedral voxels being of one or more sizes.

13. The system of claim 11, wherein the instructions when executed further cause the system to:

determine the values for a selected light source based at least in part upon directionality information for the selected light source with respect to respective octahedral voxels.

14. The system of claim 10, wherein the instructions when executed further cause the system to:

use the values to build cumulative distribution functions (CDFs) for the plurality of spatial regions; and cache selection probability data determined according to the CDFs for the plurality of spatial regions, the selection probability data to be used to select the second set of rays.

15. The system of claim 14, wherein the instructions when executed further cause the system to:

update the CDFs for the plurality of spatial regions for at least a subset of images of an image sequence for the virtual environment.

16. The system of claim 10, wherein the instructions when executed further cause the system to:

determine the values for the two or more light sources with respect to the plurality of spatial regions based at least in part upon average light contributions for individual light sources with respect to individual spatial regions.

17. The system of claim 10, wherein the system comprises at least one of:

a system for performing graphical rendering operations;

a system for performing simulation operations;

a system for performing simulation operations to test or validate autonomous machine applications;

a system for performing deep learning operations;

a system implemented using an edge device;

a system incorporating one or more Virtual Machines (VMs);

a system implemented at least partially in a data center; or a system implemented at least partially using cloud computing resources.

18. A non-transitory computer-readable storage medium including instructions that, when performed by one or more processors, cause the one or more processors to:

determine light information for a first set of rays cast for two or more light sources in a virtual environment, the light information including average light contribution from the first set of rays determined based at least on a directional magnitude of the two or more light sources;

determine, based at least in part on the light information, values for the two or more light sources with respect to a plurality of spatial regions of the virtual environment, wherein a spatial hashing algorithm segments the virtual environment into the plurality spatial regions corresponding to a plurality of non-cubic voxels;

select, based at least in part upon the values, a second set of rays to sample for the two or more light sources with respect to the plurality of spatial regions, the second set of rays including a greater number of samples for light sources with higher values;

sample the second set of rays to obtain updated illumination information for the plurality of spatial regions; and render an image for the virtual environment using the updated illumination information.

19. The non-transitory computer-readable storage medium of claim 18, wherein the instructions when performed further cause the one or more processors to:

use the spatial hashing algorithm to determine the plurality of spatial regions of the virtual environment, wherein the plurality of spatial regions are octahedral voxels of one or more sizes.

20. The non-transitory computer-readable storage medium of claim 19, wherein the instructions when performed further cause the one or more processors to:

determine the values for a selected light source based at least in part upon directionality information for the selected light source with respect to respective octahedral voxels.

* * * * *